United States Patent
Herzog et al.

(10) Patent No.: US 12,251,777 B2
(45) Date of Patent: *Mar. 18, 2025

(54) DEVICE FOR THE ADDITIVE PRODUCTION OF THREE-DIMENSIONAL COMPONENTS

(71) Applicant: Concept Laser GmbH, Lichtenfels (DE)

(72) Inventors: Frank Herzog, Lichtenfels (DE); Florian Bechmann, Lichtenfels (DE); Tobias Bokkes, Untersiemau (DE); Fabian Zeulner, Lichtenfels (DE)

(73) Assignee: Concept Laser GmbH, Lichtenfels (DE)

(*) Notice: Subject to any disclaimer, the term of this patent is extended or adjusted under 35 U.S.C. 154(b) by 534 days.

This patent is subject to a terminal disclaimer.

(21) Appl. No.: 17/514,447

(22) Filed: Oct. 29, 2021

(65) Prior Publication Data
US 2022/0152738 A1 May 19, 2022

Related U.S. Application Data

(63) Continuation of application No. 15/540,009, filed as application No. PCT/EP2016/050470 on Jan. 12, 2016, now Pat. No. 11,179,806.

(30) Foreign Application Priority Data

Jan. 14, 2015 (DE) .......................... 102015000102.7

(51) Int. Cl.
*B33Y 30/00* (2015.01)
*B22F 10/28* (2021.01)
(Continued)

(52) U.S. Cl.
CPC ............ *B23K 26/342* (2015.10); *B22F 10/28* (2021.01); *B22F 12/49* (2021.01); *B22F 12/90* (2021.01);
(Continued)

(58) Field of Classification Search
CPC ......... B29C 64/153; B22F 12/49; B22F 12/90
See application file for complete search history.

(56) References Cited

U.S. PATENT DOCUMENTS

| 6,126,884 | A |   | 10/2000 | Kerekes et al. |
| 6,129,884 | A | * | 10/2000 | Beers ..................... B33Y 30/00 372/12 |

(Continued)

FOREIGN PATENT DOCUMENTS

| DE | 202010010771 U1 | 11/2011 |
| DE | 102012224113 A1 | 2/2014 |

(Continued)

OTHER PUBLICATIONS

PCT International Search Report Corresponding to PCT/EP2016/050470 on Apr. 28, 2016.

*Primary Examiner* — Seyed Masoud Malekzadeh
(74) *Attorney, Agent, or Firm* — Dority & Manning, P.A.

(57) ABSTRACT

A process monitoring system for an additive manufacturing apparatus includes a scanner, a sensor device, and an optical focus-tracking device. The scanner includes an optical adjustment device that directs a melting beam emitted by a laser melting device onto a construction plane to generate a melting section of the construction plane. The sensor device may detect reflected radiation from the melting section and generate sensor data indicative of a size, shape, and/or temperature corresponding to the melting section. The optical focus-tracking device includes a focusing lens located between the scanner and the sensor device. The focusing lens may be actuatable by electronic machine data derived from the sensor data to impart a first focus adjustment with respect to the reflected radiation detected by the sensor followed by a second focus adjustment with respect to the melting beam directed by the optical adjustment device.

19 Claims, 1 Drawing Sheet

(51) Int. Cl.
*B22F 12/00* (2021.01)
*B22F 12/41* (2021.01)
*B22F 12/44* (2021.01)
*B22F 12/49* (2021.01)
*B22F 12/90* (2021.01)
*B23K 26/03* (2006.01)
*B23K 26/046* (2014.01)
*B23K 26/082* (2014.01)
*B23K 26/342* (2014.01)
*B28B 1/00* (2006.01)
*B28B 17/00* (2006.01)
*B29C 64/153* (2017.01)
*B29C 64/393* (2017.01)
*B33Y 50/02* (2015.01)
*B22F 10/31* (2021.01)
*B22F 10/366* (2021.01)
*B22F 10/368* (2021.01)
*B22F 10/80* (2021.01)
*B22F 10/85* (2021.01)

(52) U.S. Cl.
CPC .......... *B23K 26/034* (2013.01); *B23K 26/046* (2013.01); *B23K 26/082* (2015.10); *B28B 1/001* (2013.01); *B28B 17/0081* (2013.01); *B29C 64/153* (2017.08); *B29C 64/393* (2017.08); *B33Y 30/00* (2014.12); *B33Y 50/02* (2014.12); *B22F 10/31* (2021.01); *B22F 10/366* (2021.01); *B22F 10/368* (2021.01); *B22F 10/80* (2021.01); *B22F 10/85* (2021.01); *B22F 12/22* (2021.01); *B22F 12/41* (2021.01); *B22F 12/44* (2021.01); *B22F 2999/00* (2013.01); *Y02P 10/25* (2015.11)

(56) References Cited

U.S. PATENT DOCUMENTS

| | | | | |
|---|---|---|---|---|
| 6,132,667 A * | 10/2000 | Beers | ............ | B33Y 10/00 425/375 |
| 6,241,934 B1 * | 6/2001 | Everett | ............ | B33Y 30/00 425/375 |
| 6,325,961 B1 * | 12/2001 | Beers | ............ | B29C 64/40 425/375 |
| 6,600,129 B2 | 7/2003 | Shen et al. | | |
| 9,061,465 B2 | 6/2015 | Hagiwara et al. | | |
| 10,265,912 B2 * | 4/2019 | Herzog | ............ | B23K 31/12 |
| 10,759,117 B2 * | 9/2020 | Herzog | ............ | B23K 31/12 |
| 10,786,948 B2 * | 9/2020 | Dave | ............ | B22F 10/20 |
| 11,179,806 B2 * | 11/2021 | Herzog | ............ | B23K 26/034 |
| 11,478,854 B2 * | 10/2022 | Dave | ............ | B22F 10/20 |
| 11,701,740 B2 * | 7/2023 | Herzog | ............ | B22F 10/28 264/401 |
| 2005/0045090 A1 | 3/2005 | Ikegami et al. | | |
| 2009/0206065 A1 * | 8/2009 | Kruth | ............ | B29C 64/393 219/121.65 |
| 2010/0134628 A1 | 6/2010 | Pfitzner et al. | | |
| 2013/0168902 A1 * | 7/2013 | Herzog | ............ | B23K 31/125 264/401 |
| 2014/0035205 A1 | 2/2014 | Hagiwara et al. | | |
| 2015/0048064 A1 * | 2/2015 | Cheverton | ............ | B23K 26/34 219/121.64 |
| 2015/0375456 A1 * | 12/2015 | Cheverton | ............ | B33Y 50/02 425/169 |
| 2016/0016255 A1 | 1/2016 | Bruck et al. | | |
| 2016/0114431 A1 * | 4/2016 | Cheverton | ............ | B22F 10/31 219/76.1 |
| 2016/0175935 A1 * | 6/2016 | Ladewig | ............ | G02B 7/287 425/78 |
| 2016/0185048 A1 * | 6/2016 | Dave | ............ | B22F 10/368 700/119 |
| 2016/0236279 A1 * | 8/2016 | Ashton | ............ | B29C 64/153 |
| 2018/0178449 A1 * | 6/2018 | Cheverton | ............ | B29C 64/268 |
| 2018/0186078 A1 * | 7/2018 | Herzog | ............ | B22F 10/28 |
| 2019/0202129 A1 * | 7/2019 | Herzog | ............ | B33Y 10/00 |
| 2024/0173920 A1 | 5/2024 | Dicken | ............ | B22F 10/28 |

FOREIGN PATENT DOCUMENTS

| | | |
|---|---|---|
| DE | 102013201629 A1 | 7/2014 |
| JP | 2009291811 A | 12/2009 |
| JP | 2014028996 A | 2/2014 |
| WO | WO2007/147221 A1 | 12/2007 |

* cited by examiner

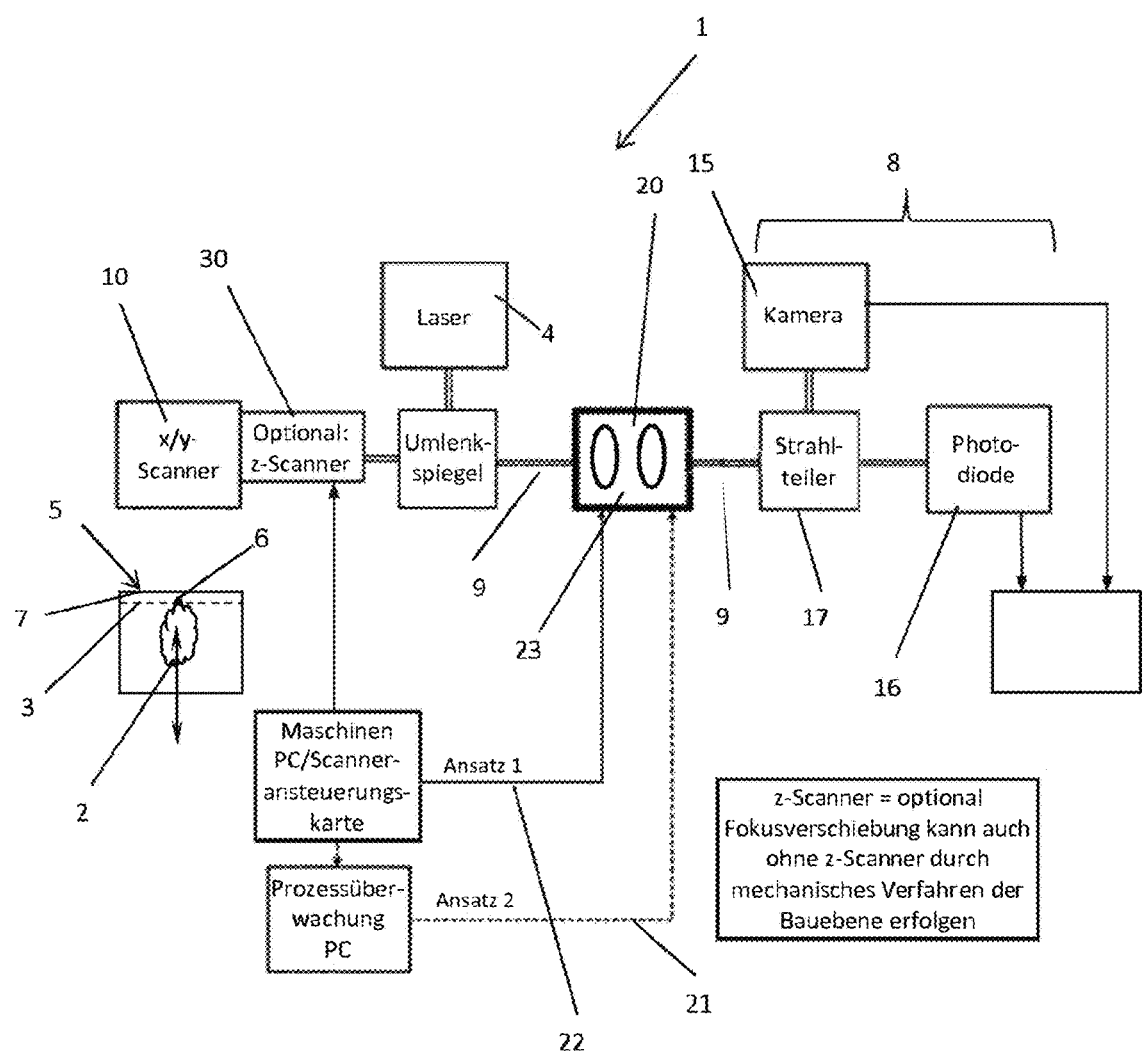

DEVICE FOR THE ADDITIVE PRODUCTION OF THREE-DIMENSIONAL COMPONENTS

CROSS-REFERENCE TO RELATED APPLICATIONS

This application is a continuation of U.S. application Ser. No. 15/540,009, filed Jun. 26, 2017, now U.S. Pat. No. 11,179,806, which is a National Stage Entry under 35 U.S.C. § 371 of PCT application serial number PCT/EP2016/050470, filed Jan. 12, 2016, which claims priority to German Patent Application No. 10 2015 000 102.7, filed Jan. 14, 2015, the contents of which are incorporated herein by reference in their entirety as if set forth verbatim.

BRIEF DESCRIPTION OF THE DRAWING

Exemplary embodiments of the present disclosure are described with reference to the following Figure:

The figure shows a schematic diagram of a device for the additive production of three-dimensional components that includes a process monitoring system with optical focus tracking device.

DETAILED DESCRIPTION

The present disclosure relates to a device for the additive production of three-dimensional components, namely a laser sintering device or a laser melting device.

In such devices, a component is produced by successive solidification of individual layers of construction material, especially powder material, as the result of the impact of a radiation by melting on the construction material. The melting section created by a point-type or linear energy input is detected regarding its dimension, shape or temperature using a sensor device. Therefrom sensor values for evaluating a component quality are derived. The radiation created by the melting section and used for the generation of the sensor values penetrates the scanner employed for the melting energy input. Such a device is e.g. known from DE 20 2010 010 771 U1.

Alternatively, a change of focus of the melting beam can also be carried out by a change of the distance between construction plane and scanner optics, namely by lowering and lifting the construction platform.

The present disclosure is based on the object of designing a device with the features of the present disclosure such that, in case of a variation of the laser focus and thus the laser spot size variation, an optimized performance of process monitoring can be ensured. This object is solved by the present disclosure.

The device according to the present disclosure first comprises a device enabling a focus displacement and thus also a spot size variation. On the one hand, this can take place by so-called 3D scanning optics, with which a focus adjustment, i.e. a spot size change of the laser spot size, on the surface to be molten is possible in the process.

Furthermore, it is provided to arrange an optical focus tracking device between the scanner of the device and the sensor device of the process monitoring system, which can be actuated by electronic machine data used in the device during the process to track focus.

With that measure, an automatic adjustment of the "field of view" of the process monitoring system to the conditions actually present in the process on the powder surface in the section of the melting spot is carried out. When the spot size of the melting beam increases, then the angle of vision of the process monitoring system is enlarged by the process data used such that an increased melting spot can be detected by the process monitoring system fully, i.e. also in the edge regions thereof, so that accurate data for the process monitoring are available. The same applies in case of a reduction in the melting spot, then the optical focus tracking device controlled by electronic machine data will provide that the reduced melting pool can be accurately examined, which also results in a definite improvement in the process monitoring result.

A manual tracking for example by manual adjustment of objective lens systems of the process monitoring system can be omitted; the process monitoring procedure is automatically adjusted to that focus, by which the powder is molten on.

The machine data used to track focus of the process monitoring system can e.g. be scanner actuation data of the PC scanner actuation card of the device, which controls the focus of the scanner lens in the presence of a so-called 3D scanner. However, the machine data can also be data derived from or comprising construction process parameters.

The focus tracking optics have at least one optical focusing element, for example a focusing lens, that can be moved by a motor, but the focusing element can also be formed as a lens set that can be moved by a motor.

In order to in each case guarantee an improvement to the process monitoring, it can be of particular advantage, when the focus tracking optics of the process monitoring system are performed prior to the focus adjustment of the melting beam directed to the layer of powder. This means that the scanner data at first perform a focus adjustment of the process monitoring system, and the focus adjustment for the melting beam, also controlled by the machine data, follows the focus adjustment of the process monitoring system. This can take place by a simple delay circuit or delaying control that e.g. carries out a focus adjustment of the melting beam only when the process monitoring system is already set to the new focus.

The sensor device can comprise a plurality of photosensitive elements that can selectively or also collectively be brought into the beam or a partial beam of the process monitoring system. This can be done by deflection mirrors, beam splitters or the like. When beam splitters are used, it is possible to operate several or all photosensitive elements of the sensor device in parallel and optionally to take parallel measurements in different spectral regions that can be introduced into the process monitoring. Possible sensor regions are a wavelength range of e.g. 780-950 nm, another wavelength range possibly of interest can be chosen at around 1,200 nm.

In each case, it needs to be ensured that a melting beam focus adjustment in the area of process monitoring is compensated by the focus tracking device.

The device 1 shown in the figure of the drawings is for the additive production of three-dimensional components 2 produced by successive solidification of individual layers 3 of construction material that can be solidified as the result of the impact of a radiation 4 by melting on the construction material 5. The melting section 6 in the construction plane 7 created by a point-type or linear energy input is detected using a sensor device 8 of a process monitoring system regarding its dimension shape and/or regarding its temperature. Therefrom sensor values for evaluating a component quality are derived, wherein the radiation 9 created by the melting section 6 and used for the generation of the sensor values penetrates the scanner 10 employed for the melting energy input in reverse direction, and is directed to the sensor device 8 of the process monitoring system by said scanner. Process monitoring systems, in which the reflected radiation created by the melting section is directed to a sensor device by the scanner in reverse direction, are referred to as so-called coaxial process monitoring systems, because the radiation emanating the laser for energy input and the reflected radiation for the process monitoring system penetrate the scanner coaxially.

The sensor device 8 can comprise a camera 15, a photodiode 16 or also several photosensitive elements, wherein it can be provided that the radiation 9 used for the generation of sensor values penetrates a beam splitter 17, which distributes the radiation e.g. to the camera, the photodiode or further photosensitive elements.

According to the present disclosure, an optical focus tracking device 20 is arranged between the scanner 10 and the sensor device 8 of the process monitoring system, which can be readjusted by electronic machine data 21, 22 to track focus.

The focus tracking device comprises at least one optical focusing element that can be adjusted by a motor, e.g. a lens set 23 that can be moved by a motor, which serves the purpose of performing a refocusing of the radiation 9 used for the generation of the sensor values.

Refocusing is performed, when either the optical path of the device comprising at least the radiation source and the scanner is provided with an optical adjustment device 30 for melting beam focus adjustment, or a focus adjustment of the melting beam is carried out by mechanically moving the construction plane 7.

The machine data can on the one hand be or comprise scanner actuation data from a scanner actuation card, wherein such scanner actuation data primarily affect a 3D scanner regarding the z-axis focusing.

The machine data can, however, also be or comprise data derived from construction process parameters, especially data used for height adjustment of the construction plane, because a height adjustment of the construction plane also results in defocusing the melting beam.

The machine data delivered to the focus tracking device 20 can be controlled regarding time such that a focus tracking of the radiation 9 used for the generation of the sensor values using the focus tracking device 20 results into a z-axis adjustment of a 3D scanner 10 or a height adjustment of the construction plane. This ensures that upon application of the laser radiation and thus generation of the melting pool, which is to be monitored, the beam 9 used for the generation of the sensor values is already optimized regarding its focus.

In order to be able to evaluate the data from the sensor device 8, i.e. the camera data from the camera 15 and the sensor data from the photodiode 16, a processor unit is provided, in which the data can be processed, stored and be brought into a format that enables visualization of the 3D data for example for reverse engineering.

LIST OF REFERENCE NUMBERS

1 Device
2 Component
3 Layer
4 Radiation
5 Construction material
6 Melting section
7 Construction plane
8 Sensor device
9 Radiation
10 Scanner
15 Camera
16 Photodiode
17 Beam splitter
20 Focus tracking device
21 Machine data
22 Machine data
23 Lens set

The invention claimed is:

1. A process monitoring system for an apparatus for additively manufacturing three-dimensional objects, the process monitoring system comprising:
   a scanner comprising an optical adjustment device configured to direct a melting beam emitted by a laser melting device onto a construction plane to generate a melting section of the construction plane;
   a sensor device configured to detect reflected radiation from the melting section and to generate sensor data indicative of a size, shape, and/or temperature corresponding to the melting section; and
   an optical focus-tracking device comprising a focusing lens located between the scanner and the sensor device, the focusing lens actuatable by electronic machine data derived at least in part from the sensor data to impart a first focus adjustment with respect to the reflected radiation detected by the sensor followed by a second focus adjustment with respect to the melting beam directed by the optical adjustment device.

2. The process monitoring system of claim 1, wherein the second focus adjustment is carried out at least in part by mechanically adjusting the construction plane.

3. The process monitoring system of claim 1, wherein the second focus adjustment is carried out at least in part by the optical adjustment device.

4. The process monitoring system of claim 1, wherein the process monitoring system comprises a delay circuit or a delaying control configured to perform the second focus adjustment after the first focus adjustment.

5. The process monitoring system of claim 1, wherein the focusing lens comprises a lens set that can be moved by a motor.

6. The process monitoring system of claim 1, wherein the sensor device comprises a plurality of photosensitive elements.

7. The process monitoring system of claim 1, wherein at least a portion of the sensor device is configured for a wavelength range of from 780 nm to 950nm.

8. The process monitoring system of claim 1, wherein at least a portion of the sensor device is configured for a wavelength range of around 1,200 nm.

9. The process monitoring system of claim 1, wherein the sensor device comprises a camera, a photodiode, and a beam splitter configured to direct a first portion of the reflected radiation to the camera and a second portion of the reflected radiation to the photodiode.

10. A method of focusing an optical focus-tracking device used by a process monitoring system for an apparatus for additively manufacturing three-dimensional objects, the method comprising:
   directing a melting beam emitted by a laser melting device onto a construction plane to generate a melting section of the construction plane, the melting beam directed by a scanner comprising an optical adjustment device, detecting, with a sensor device, reflected radiation from the melting section and generating sensor data indicative of a size, shape, and/or temperature corresponding to the melting section, and actuating a focusing lens of an optical focus-tracking device by electronic machine data derived at least in part from the sensor data, wherein the focusing lens is located between the scanner and the sensor device, and wherein actuating the focusing lens comprises imparting a first focus adjustment with respect to the reflected radiation detected by the sensor followed by imparting a second focus adjustment with respect to the melting beam directed by the optical adjustment device.

11. The method of claim 10, wherein the imparting the second focus adjustment comprises mechanically adjusting the construction plane.

12. The method of claim 10, wherein the imparting the second focus adjustment comprises moving the optical adjustment device.

13. The method of claim 10, wherein the process monitoring system comprises a delay circuit or a delaying control configured to perform the second focus adjustment after the first focus adjustment.

14. The method of claim 10, wherein imparting the first focus adjustment comprises moving the focusing lens using a motor.

15. The method of claim 10, wherein the sensor device comprises a plurality of photosensitive elements.

16. The method of claim 10, wherein at least a portion of the sensor device is configured for a wavelength range of from 780 nm to 950 nm.

17. The method of claim 10, wherein at least a portion of the sensor device is configured for a wavelength range of around 1,200 nm.

18. The method of claim 10, wherein the sensor device comprises a camera, a photodiode, and a beam splitter configured to direct a first portion of the reflected radiation to the camera and a second portion of the reflected radiation to the photodiode.

19. A non-transitory computer readable medium comprising computer-executable instructions, which when executed by a processor associated with an apparatus for additively manufacturing three-dimensional objects, causes the apparatus to perform a method of focusing an optical focus-tracking device used by a process monitoring system associated with the apparatus, the method comprising:

directing a melting beam emitted by a laser melting device onto a construction plane to generate a melting section of the construction plane, the melting beam directed by a scanner comprising an optical adjustment device;

detecting, with a sensor device, reflected radiation from the melting section and generating sensor data indicative of a size, shape, and/or temperature corresponding to the melting section; and actuating a focusing lens of an optical focus-tracking device by electronic machine data derived at least in part from the sensor data, wherein the focusing lens is located between the scanner and the sensor device, and wherein actuating the focusing lens comprises imparting a first focus adjustment with respect to the reflected radiation detected by the sensor followed by imparting a second focus adjustment with respect to the melting beam directed by the optical adjustment device.

* * * * *